United States Patent Office 2,849,464
Patented Aug. 26, 1958

2,849,464

6-METHYL, Δ⁴, 3-KETO ANDROSTENE DERIVATIVES

Milton E. Herr and George B. Spero, Kalamazoo, Mich., assignors to The Upjohn Company, Kalamazoo, Mich., a corporation of Michigan No Drawing. Application May 27, 1957
Serial No. 661,624

8 Claims. (Cl. 260—397.45)

The present invention relates to new steroids and is more particularly concerned with 6-methyl-11β,17β-dihydroxy-4-androstene-3-one, 6-methyl-17β-hydroxy-4-androstene-3,11-dione, the 17β-acylates thereof, 6-methyl-11β-hydroxy-4-androstene-3,17-dione, and 6-methyladrenosterone.

The novel steroids and the process for the production therefore are represented by the following sequence of formulae:

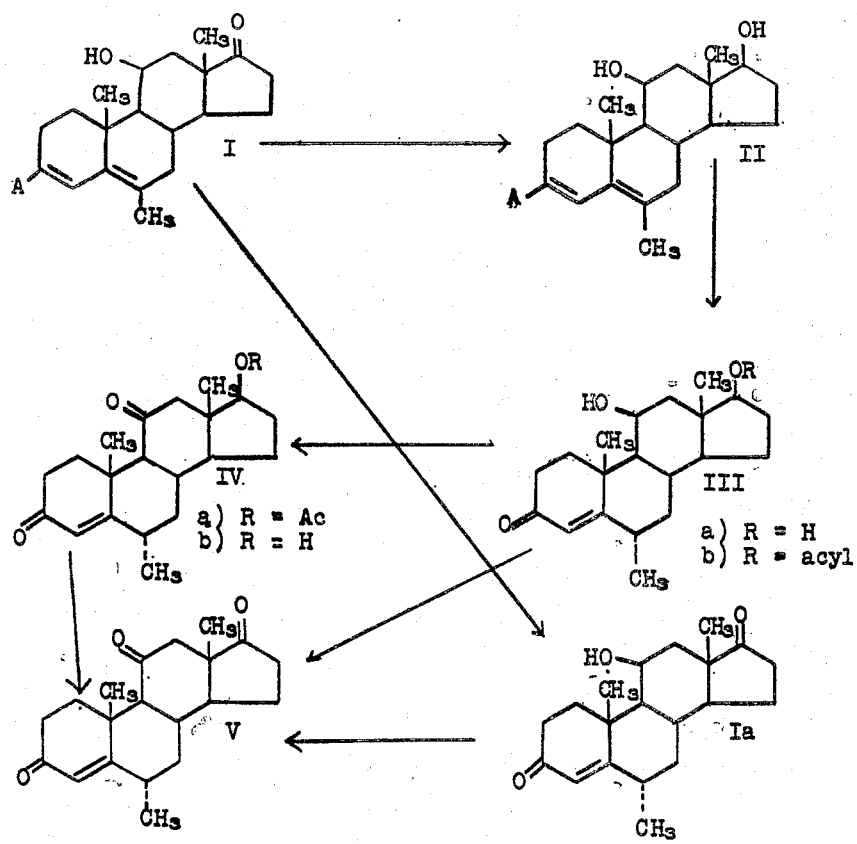

wherein A is a tertiary amino radical of the formula

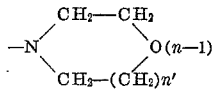

in which n and n' are whole numbers from one to two, inclusive, and wherein R is selected from the group consisting of hydrogen and an acyl radical of a hydrocarboncarboxylic acid containing from one to nine carbon atoms, inclusive.

The process of the present invention comprises: reducing 3 - (N - cyclic tertiaryamino)-6-methyl-11β-hydroxy-3,5-androstadiene-17-one (I) with a metal hydride such as lithium aluminum hydride, sodium hydride, sodium borohydride, potassium borohydride, and the like to obtain 3 - (N-cyclic tertiaryamino)-6-methyl-11β,17β-dihydroxy-3,5-androstadiene (II); hydrolyzing the thus obtained 3-(N-cyclic tertiaryamino)-6-methyl-11β,17β-dihydroxy-3,5-androstadiene in an acidic or basic aqueous solution, for example with dilute acetic acid, sodium acetate and acetic acid in aqueous ethanol, or bases such as sodium hydroxide, potassium hydroxide in aqueous alcoholic solution to obtain 6-methyl-11β,17β-dihydroxy-4-androstene-3-one (IIIa). Esterification of compound IIIa gives the ester 6-methyl-11β-hydroxy-17β-acyloxy-4-androstene-3-one (IIIb). Oxidizing compound IIIb with chromic acid, or an acidified solution of an N-halo acid amide such as N-bromoacetamide, N-chloroacetamide, N-bromosuccinimide, N-chlorosuccinimide or the like oxidants, gives the corresponding ester of 6-methyl-17β-hydroxy-4-androstene-3,11-dione (IVa). Hydrolysis of the thus obtained ester IVa with a base, for example sodium hydroxide or potassium hydroxide in ethanol gives the free alcohol, 6-methyl-17β-hydroxy-4-androstene-3,11-dione (IVb). Oxidizing the thus obtained compound IVb with chromic acid yields 6-methyladrenosterone (V). In a similar manner oxidation with chromic acid of 6-methyl-11β-hydroxy-4-androstene-3,17-dione, (Ia) obtained by hydrolysis of the corresponding enamine, 3 - (N-cyclic tertiaryamino) 6-methyl-11β-hydroxy-3,5-androstadiene-17-one (I) produces 6-methyladrenosterone (V). Similarly 6-methyladrenosterone is obtained by oxidizing 6-methyl-11β,17β-dihydroxy-4-androstene-3-one (IIIa) with chromic acid.

It is an object of the instant invention to provide 6α-methyl-11β,17β-dihydroxy-4-androstene-3-one, 6α-methyl-17β-hydroxy-4-androstene-3,11-dione, the 17β-esters thereof, 6α-methyl-11β-hydroxy-4-androstene-3,17-dione, and 6α-methyladrenosterone. It is another object of the instant invention to provide the necessary starting materials and processes for the production of the instant compounds.

The new compounds, 6-methyl-11β,17β-dihydroxy-4-androsten-3-one, 6-methyl-17β-hydroxy-4-androstene-3,11-dione, 6-methyl-11β-hydroxy-4-androstene-3,17-dione the 17-esters thereof and 6-methyladrenosterone, especially in the form of the 6α-epimers are compounds of high anabolic and low androgenic activity. These compounds are, therefore, useful to produce an increase of protein-anabolism in the animal organism, e. g. in those individuals with impaired nitrogen metabolism, especially in senile individuals, without causing undesirable side effects such as virilization in females or increase of libido in males. The compounds also act upon the central nervous system possessing tranquillizing-sedative and sedative potentiating activities. They are particularly useful when administered by injection, especially as suspensions in oil.

The 6α-methyl-11β-hydroxytestosterone and 6α-methyl-11-ketotestosterone may be used as sedative or antihypertensive agents in oral preparations, in the form of tablets together with Evipal Sodium (hexyl barbital sodium). For symptomatic treatment in senile individuals to increase protein-anabolism, 6α-methyl-11β-hydroxytestosterone, 6α-methyl-11-ketotestosterone, 6α-methyl-11β-hydroxy-4-androstene-3,17-dione and 6α-methyladrenosterone may be used in either oral or injectable form. The 6α-methyl-11β-hydroxytestosterone ester and 6α-methyl-11β-hydroxy-4-androstene-3,17-dione is also an important intermediate in the production of the 9α-halo analogs, especially the 6α-methyl-9α-fluoro-11β-hydroxytestosterone, the 11-keto-analogs thereof, the 17-esters thereof, the 6α-methyl-9α-fluoro-11β-hydroxy-4-androstene-3,17-dione and the 6α-methyl-9α-fluoro-adrenosterone, as shown in detail in Examples 14 thru 16. The 6α-methyl-9α-fluoro-11β-hydroxytestosterone and 6α-methyl-9α-fluoro-11-ketotestosterone are particular potent anabolic agents with favorable protein-anabolic androgenic ratios and thus useable wherever an increase in the protein metabolism is desirable in patients.

The starting material of the instant invention is the 3-(N-cyclictertiaryamino)-6-methyl-11β-hydroxy-3,5-androstadien-17-one as shown in Preparations 1 through 4, inclusive.

In carrying out the process of the present invention the selected 3-(N-cyclictertiaryamino)-6-methyl-11β-hydroxy-3,5-androstadien-17-one is reduced to yield the respective 3-(N-cyclictertiaryamino)-6-methyl-11β,17β-dihydroxy-3,5-androstadiene. The reaction is carried out by dissolving the enamine in a solvent which is unreactive under the reaction conditions such as, for example, ether, benzene, tetrahydrofuran, and other like solvents, with ether and tetrahydrofuran preferred. Reducing agents such as, for example, lithium aluminium hydride, lithium borohydride, sodium or potassium borohydride, sodium hydride, are operative, with lithium aluminum hydride preferred. In the preferred embodiment of the process, lithium aluminum hydride is admixed with a suitable organic solvent such as for example, ether or tetrahydrofuran, and the starting enamine is separately dissolved in a solvent such as, for example, tetrahydrofuran, benzene or the like. The two mixtures are then combined to form the reaction mixture by gradual addition of the steroid solution to the lithium aluminum hydride solution. The temperature of the reaction mixture is usually maintained between zero and about 100 degrees centigrade with a temperature between room temperature (twenty to thirty degrees centigrade) and the reflux temperature of the reaction mixture being preferred, for a period varying from a few minutes to about four hours or more. When lithium aluminum hydride is used as a reducing agent, the reaction is advantageously first conducted at temperatures between about zero and fifty degrees centigrade, preferably at about room temperature. During the latter phases of the reaction higher temperatures can be utilized, the reflux temperature of the reaction mixture usually being the upper temperature limit. The reactants are preferably mixed and stirred for about five minutes to about one hour at room temperature and subsequently may be refluxed for five minutes or longer under atmospheric pressure, the total reaction time depending in part upon the ratio of the starting reactants and the temperatures employed.

The ratio of reducing agent to starting enamine steroids can be varied over a wide range, a substantial excess of the reducing agent generally being employed with molar ratios from two to one and up to fifty to one and above being operative.

From the thus obtained 3-(N-cyclictertiaryamino)-6-methyl-11β,17β-dihydroxy-3,5-androstadiene (II) one obtains 6-methyl-11β,17β-dihydroxy-4-androsten-3-one through hydrolysis of compound II. Usually the 3-(N-cyclictertiaryamino)-6-methyl-11β,17β-dihydroxy-3,5-androstadiene, obtained by the reduction, is not isolated, but immediately upon completion of the reaction hydrolyzed by the addition of water, at first to decompose the first obtained organo-metal complex and then the enamine. The enamine is hydrolyzed in any known manner either in aqueous alcoholic solution by heating or in acid or alkali solutions, for example, in dilute acetic acid, or in alkali solutions such as sodium or potassium hydroxide in aqueous methanol, ethanol or other water-soluble alkanols. The hydrolysis is often made in buffer solutions, such as in a solution of acetic acid containing sodium acetate and aqueous ethanol. The reaction temperature during hydrolysis is usually the reflux temperature of the mixture and is generally between fifty to 100 degrees. After the reaction is terminated the thus obtained 6-methyl-11β,17β-dihydroxy-4-androsten-3-one is generally recovered from the reaction mixture by conventional procedures, for example, by adding water and recovering the water-insoluble steroid from a filter or by extracting with a water-immiscible solvent such as ether, benzene, toluene, halogenated hydrocarbons, such as chloroform, ethylene dichloride, carbon tetrachloride, methylene chloride, or the like. Prior to diluting the reaction mixture with water or extracting with a water-immiscible solvent, the reaction mixture is generally acidified so as to make soluble other water insoluble salts that might interfere with the extraction or the filtration process. The thus obtained 6-methyl-11β,17β-dihydroxy-4-androsten-3-one is purified in conventional manner, for example, by recrystallization from organic solvents such as methanol, ethanol, acetone, Skellysolve B hexanes, ethyl acetate, or the like, or if deemed necessary by chromatography.

Esters of the thus obtained 6-methyl-11β,17β-dihydroxy-4-androsten-3-one (IIIa) are prepared by conventional means such as by treating at room temperature the 6-methyl-11β,17β-dihydroxy-4-androsten-3-one with an acid halide, acid anhydride, isopropenylacylate, ketene or other acylating agents in a solvent, such as pyridine, to obtain the desired ester. The thus obtained 6-methyl-11β,17β-dihydroxy-4-androsten-3-one 17β-acylate (IIIb) is isolated from the reaction mixture usually by quenching the reaction mixture with water and recovering the ester by filtration as precipitate or by extracting with a water-immiscible solvent as described for the free alcohol previously.

The thus obtained 17β-ester of 6-methyl-11β,17β-dihydroxy-4-androsten-3-one is oxidized in known manner to give the corresponding 6-methyl-17β-hydroxy-4-androstene-3,11-dione 17β-acylate. As oxidants are commonly used chromic acid, sodium or potassium dichromate in acidic solution, N-haloacidamides and N-haloacidimides such as N-chloro- or bromoacetamides, N-chloro- or bromosuccinimide, and the like, or other oxidants. The details of the oxidation are further reported in the examples.

From the thus obtained 6-methyl-17β-hydroxy-4-androstene-3,11-dione 17β-acylate (IVa), one obtains the free alcohol, 6-methyl-17β-hydroxy-4-androstene-3,11-dione by hydrolysis in conventional manner, that is usually with a base such as sodium or potassium hydroxide in aqueous alcoholic or other solutions. After the reaction is terminated, the reaction mixture is neutralized and the thus produced 6-methyl-17β-hydroxy-4-androstene13,11-dione (IVb) is recovered by either filtering the product obtained upon dilution with water or by extracting in conventional manner.

Oxidizing 6 - methyl-17β-hydroxy-4-androstene-3,11-dione (IVb) or 6-methyl-11β,17β-dihydroxy-4-androsten-3-one (IIIa) with chromic acid in conventional manner and in sufficient quantity furnishes the 6-methyladrenosterone (V). Similarly, 6-methyladrenosterone can be obtained by first hydrolyzing the 3-(N-cyclictertiaryamino)-11β-hydroxy-3,5-androstadien-17-one in an aqueous medium, preferably a neutral alcoholic basic medium, for example, 95 percent ethanol, to give the corresponding 6-methyl-11β-hydroxy-4-androstene-3,17-dione (see Example 12), and oxidizing the thus obtained 6-methyl-11β-hydroxy-4-androstene-3,17-dione in known manner with chromic acid or an alkali metal dichromate in acidic solution to give 6-methyladrenosterone.

The following preparations and examples are illustrative of the products and the processes of the present invention and are not to be construed as limiting.

PREPARATION 1

*5,6-oxido-11β-hydroxyandrostane-3,17-dione 3,17-bis-(ethylene ketal)*

A solution of 20.48 grams of 11β-hydroxy-5-androstene-3,17-dione 3,17-bis-(ethylene ketal) [Bernstein et al., J. Org. Chem. 18, 1166 (1953)] in 400 milliliters of chloroform was added with stirring to an ice-bath cooled mixture of forty milliliters of forty percent peracetic acid and four grams of sodium acetate. The mixture was stirred in an ice water bath for 105 minutes and 400 milliliters of chloroform was then added. Thereafter 400 milliliters of saturated sodium bicarbonate solution was added and after mixing thoroughly the organic layer was separated from the aqueous layer.

The organic layer was thereupon washed twice with water, dried over anhydrous sodium sulfate and concentrated to 100 milliliters on a steam bath. Thereafter 100 milliliters of benzene was added, the mixture was concentrated and cooled at room temperature to give 14.42 grams of crude 5,6 - oxido - 11β - hydroxyandrostane-3,17-dione 3,17-bis-(ethylene ketal) of melting point 226–232 degrees centigrade. A sample was recrystallized from acetone to give pure 5,6-oxido-11β-hydroxyandrostane-3,17-dione 3,17-bis-(ethylene ketal) of melting point 225 to 230 degrees centigrade and rotation $[\alpha]_D$ of 58 degrees in chloroform.

*Analysis.*—Calcd. for $C_{23}H_{34}O_6$: C, 67.95; H, 8.43. Found: C, 68.16; H, 8.80.

In the same manner given in Preparation 1, treating other bis-(alkylene ketals) with peracids, e. g., performic acid, peracetic acid, perbenzoic acid and the like, usually at low temperatures, yields the corresponding 5,6-oxido-11β-hydroxyandrostane - 3,17 - dione 3,17 - bis - (alkylene ketal). Representative such diketals comprise the 5,6-oxido-11β-hydroxyandrostane-3,17-dione 3,17-bis(1,3-propylene ketal), 3,17-bis-(2,3-butylene ketal), 3,17-bis-(1,2-butylene ketal), 3,17-bis-(butylene 1,3-ketal), and the like.

PREPARATION 2

*5α,11β-dihydroxy-6β-methylandrostane-3,17-dione 3,17-bis-(ethylene ketal)*

A solution of 4.07 grams (0.01 mole) of 5,6-oxido-11β-hydroxyandrostane-3,17-dione 3,17 - bis - (ethylene ketal), dissolved in 250 milliliters of tetrahydrofuran, was added under a nitrogen atmosphere during a period of ten minutes with mechanical stirring to a mixture of fifty milliliters of four molar methyl magnesium bromide in diethyl ether. The mixture was then distilled until the vapor temperature at the head of the distilling column was sixty degrees centigrade at which point the downward condenser was replaced with a reflux condenser protected with a calcium chloride tube. The mixture was thereupon heated at reflux for a period of seventeen hours whereafter the reaction mixture was cooled to room temperature and then in an ice-water bath. With the stirrer operating, 200 milliliters of benzene was added and then cautiously 100 milliliters of water from a dropping funnel. The liquid phase was decanted from the sludge residue into a separatory funnel. The residue was washed with two 100-milliliter portions of benzene which were in turn added to the original solution. The extract was washed with two 100-milliliter portions of water, 100 milliliters of ammonium chloride solution, 100 milliliters of water, and dried over sodium sulfate. The solvent was removed under reduced pressure and the solid residue was crystallized from dilute acetone to give 3.43 grams (81 percent) of 5α,11β-dihydroxy-6β-methylandrostane-3,17-dione 3,17-bis-(ethylene ketal) of melting point 185 to 190 degrees centigrade. A sample recrystallized from dilute acetone, ether-Skellysolve B, and finally methylene chloride-Skellysolve B possessed a melting point of 190 to 192 degrees centigrade and rotation $[\alpha]_D$ of minus 31 degrees in chloroform.

*Analysis.*—Calcd. for $C_{24}H_{38}O_6$: C, 68.22; H, 9.07. Found: C, 68.37; H, 9.42.

PREPARATION 3

*5α,11β-dihydroxy-6β-methylandrostane-3,17-dione*

A solution of 3.74 grams of 5α,11β-dihydroxy-6β-methylandrostane-3,17-dione 3,17-bis-(ethylene ketal), dissolved in ninety milliliters of acetic acid and thirty milliliters of water, was warmed on a steam bath for a period of forty minutes and thereupon poured under stirring onto 360 grams of cracked ice. To this mixture seventy grams of sodium bicarbonate was carefully added portion-wise and the insoluble product recovered by filtration, washed well with water, and dried to give 2.60 grams of crude 5α,11β-dihydroxy-6β-methylandrostane-3,17-dione (88 percent yield). Recrystallization of the crude material gave pure 5α,11β-dihydroxy-6β-methylandrostane-3,17-dione of melting point 230 to 235 degrees with decomposition and rotation $[\alpha]_D$ plus 66 degrees in ethanol.

*Analysis.*—Calcd. for $C_{20}H_{30}O_4$: C, 71.83; H, 9.04. Found: C, 71.53; H, 8.97.

PREPARATION 4

*3-(N-pyrrolidinyl)-6-methyl-11β-hydroxy-3,5-androstadien-17-one*

One hundred milligrams of 5α,11β-dihydroxy-6β-methylandrostane-3,17-dione, dissolved in two milliliters of hot methanol, was treated with 0.1 milliliter of pyrrolidine. The enamine begin to precipitate and after cooling to room temperature (about 24 degrees centigrade), the mixture was refrigerated to zero degrees in an ice bath. The product which precipitated was recovered by filtration and the precipitate was washed with cold methanol and dried. The yield was 99 milligrams (ninety percent yield) of 3-(N-pyrrolidinyl)-6-methyl-11β-hydroxy-3,5-androstadien-17-one of melting point 175 degrees with decomposition and rotation $[\alpha]_D$ minus 69 degrees in chloroform.

*Analysis.*—Calcd. for $C_{24}H_{35}NO_2$: C, 78.01; H, 9.55; N, 3.79. Found: C, 77.70; H, 9.37; N, 3.75.

Substituting for the pyrrolidine in Preparation 4, morpholine, piperidine or homomorpholine yields the corresponding 3 - (N - cyclictertiaryamino) - 6 - methyl - 11β-hydroxy-3,5-androstadien-17-one wherein the cyclictertiaryamino group is morpholino, piperidino, or homomorpholino.

EXAMPLE 1

6α-methyl-11β-hydroxytestosterone

A solution of 1.45 grams of 3-(N-pyrrolidinyl)-6-methyl-11β-hydroxy-3,5-androstadien-17-one in forty milliliters of dry tetrahydrofuran was added during five minutes under stirring to a mixture of 0.8 gram of lithium aluminum hydride in forty milliliters of anhydrous ether. The addition was carried out in a nitrogen atmosphere and the reaction mixture was stirred in this atmosphere for another fifteen minutes at 26 degrees centigrade. Thereafter eight milliliters of water was cautiously added dropwise followed by forty milliliters of methanol and eight milliliters of one normal sodium hydroxide. The mixture was distilled until the boiling temperature was 65 degrees centigrade and then heated at reflux for twenty minutes. Thereupon eight milliliters of acetic acid was added and the mixture was distilled in vacuum to dryness. The residue was treated with a mixture of twenty milliliters of water, twenty grams of ice and twenty milliliters of concentrated hydrochloric acid. The thus-obtained reaction mixture was filtered and the insoluble product, recovered by filtration, was washed with water and dried in vacuo at 100 degrees centigrade to give 1.11 gram of crude 6α-methyl-11β-hydroxytestosterone. Recrystallization of this material from dilute acetone and finally from methanol gave pure 6α-methyl-11β-hydroxytestosterone of melting point 269 to 272 degrees centigrade and rotation $[\alpha]_D$ plus 112 degrees in 95 percent ethanol $$\lambda_{max}^{alc.}\ 243\ m\mu\ (A_M\ 14,800)$$

*Analysis.*—Calcd. for $C_{20}H_{30}O_3$: C, 75.44; H, 9.50. Found: C, 75.17; H, 9.64.

EXAMPLE 2

6α-methyl-11β-hydroxytestosterone 17β-acetate

A solution was prepared containing in two milliliters of pyridine, 200 milligrams of 6-methyl-11β-hydroxytestosterone and one milliliter of acetic anhydride. The mixture was allowed to stand at room temperature (about 24 degrees centigrade) for a period of eighteen hours and was then poured into twenty milliliters of ice water. The aqueous mixture was allowed to stand overnight and refrigerated between zero to five degrees centigrade and was thereupon filtered the next day and the precipitated material, thus collected, was twice recrystallized from aqueous methanol to give pure 6α-methyl-11β-hydroxytestosterone 17β-acetate.

EXAMPLE 3

6α-methyl-11β-hydroxytestosterone 17β-propionate

A mixture of one milliliter of propionic anhydride, one milliliter of pyridine, and 100 milligrams of 6α-methyl-11β-hydroxytestosterone was allowed to stand at room temperature for eighteen hours and was thereupon poured into fifteen milliliters of water. The aqueous mixture was allowed to stand for twenty hours overnight and then filtered. The thus collected precipitate was recrystallized from aqueous methanol to give 6α-methyl-11β-hydroxytestosterone 17β-propionate.

EXAMPLE 4

6α-methyl-11β-hydroxytestosterone 17β-benzoate

A mixture of two milliliters of benzoyl chloride, two milliliters of pyridine and 200 milligrams of 6α-methyl-11β-hydroxytestosterone was allowed to stand at room temperature for a period of eighteen hours and thereupon poured onto ice. After melting of the ice, the mixture was extracted with three five-milliliter portions of methylene chloride, the methylene chloride solution after washing with dilute acid and water was dried over anhydrous sodium sulfate and thereupon evaporated. The thus obtained residue of crude 6α-methyl-11β-hydroxytestosterone 17β-benzoate was recrystallized three times from aqueous ethyl alcohol to give pure 6α-methyl-11β-hydroxytestosterone 17β-benzoate.

EXAMPLE 5

6α-methyl-11β-hydroxytestosterone 17β-chrysanthemum-monocarboxylate

A mixture of 0.001 mole of 6α-methyl-11β-hydroxytestosterone, 0.001 mole of chrysanthemum-monocarboxylic acid anhydride was heated in two milliliters of dibutyl ether at a temperature of 155 to 160 degrees for a period of ten hours. The mixture was transferred to a separatory funnel, diluted with diethyl ether and shaken out five times with aqueous three percent sodium hydroxide solution and thereupon five times with water. After evaporation of the ether, the thus obtained oily material was heated to 100 degrees on the water bath under three milliliters of mercury pressure. The remaining material was recrystallized three times from aqueous ethanol and two times from acetone-Skellysolve B hexanes to give 6α-methyl-11β-hydroxytestosterone 17β-chrysanthemum-monocarboxylate.

In the same manner as shown in Examples 2 through 5, inclusive, other esters of 6α-methyl-11β-hydroxytestosterone are prepared by reacting 6α-11β-hydroxytestosterone with acid anhydrides or acid halides or organic carboxylic acid and preferably hydrocarboncarboxylic acids usually in solutions such as pyridine, ether, benzene, toluene, dibutyl ether, or the like, to obtain the corresponding 17β-ester of 6-methyl-11β-hydroxytestosterone. Representative 17β-acylates of 6α-methyl-11β-hydroxytestosterone comprise the 17-butyrate, isobutyrate, valerate, isovalerate, hexanoate, heptanoate, octanoate, phenyl acetate, phenyl propionate, laureate, β-cyclopentylpropionate, salicylate, hemisuccinate, hemi-(β,β-dimethylglutarate), maleate, toluenesulfonate, benzenesulfonate, ortho-chlorobenzene-sulfonate, or the like.

EXAMPLE 6

6α-methyl-11-ketotestosterone 17β-acetate

A solution was prepared containing in five milliliters of acetic acid 0.3 gram of 6α-methyl-11β-hydroxytestosterone 17β-acetate, 150 milligrams of chromic anhydride and 0.2 milliliter of water. This mixture was allowed to stand at room temperature (approximately 26 degrees centigrade) for a period of four hours whereafter one milliliter of methanol was added. The thus obtained mixture was then poured into fifty milliliters of water and ice and the aqueous solution extracted with three fifteen milliliter portions of methylene chloride. The methylene chloride extracts were combined, washed with dilute alkali and water, dried over anhydrous sodium sulfate, evaporated, and the residue three times recrystallized from aqueous methanol to obtain 6α-methyl-11-ketotestosterone 17β-acetate.

EXAMPLE 7

6α-methyl-11-ketotestosterone 17β-propionate

A solution was prepared containing in five milliliters of acetic acid, 0.3 gram of 6α-methyl-11β-hydroxytestosterone-17β-propionate, 0.2 gram of sodium dichromate. This mixture was agitated by hand a few times while standing for a period of one hour. It was then poured into fifty milliliters of ice water, the ice water solution neutralized by the addition of sodium bicarbonate, and the thus obtained mixture extracted with three 25-milliliter portions of methylene chloride. The methylene chloride portions were combined, washed with water several times, dried over anhydrous sodium sulfate, evaporated to give a residue which was three times recrystallized from methanol to give 6α-methyl-11-ketotestosterone 17β-propionate.

In the same manner as given in Examples 6 and 7, other esters of 6-methyl-11-ketotestosterone obtained by oxidizing with chromic acid, sodium or potassium dichromate or other sources of chromic acid and dichromic acid, the corresponding 6α-methyl-11β-hydroxytestosterone 17β-acylates. Representative 6-methyl-11-ketotestosterone 17β-acylates thus prepared include the butyrate, isobutyrate, valerate, isovalerate, hexanoate, heptanoate, octanoate, phenylbenzoate, phenylacetate, laurate, chrysanthemum-monocarboxyiate, toluenesulfonate, benzenesulfonate, or the like.

EXAMPLE 8

6α-methyl-11-ketotestosterone

A solution was prepared of 0.3 gram of 6α-methyl-11-ketotestosterone 17β-acylate in 20 milliliters of one normal sodium hydroxide in ninety percent methanol-ten percent water. The resulting mixture was allowed to stand at room temperature (about 26 degrees centigrade) for a period of six hours, and thereupon poured into 100 milliliters of ice water, neutralized by the addition of dilute acetic acid and the thus obtained neutral mixture extracted three times with fifty-milliliter portions of methylene chloride. The methylene chloride portions were combined, washed with water, dried over anhydrous sodium sulfate and evaporated to give a residue. The residue was then recrystallized three times from aqueous acetone to give pure 6α-methyl-11-ketotestosterone.

EXAMPLE 9

6α-methyl-11-ketotestosterone from its propionate ester

In the same manner as given in Example 8, 6α-methyl-11-ketotestosterone 17β-propionate was hydrolyzed with potassium hydroxide in methyl alcohol and water to give 6α-methyl-11-ketotestosterone.

In the same manner as given in Examples 8 and 9, other 17β-esters of 6α-methyl-11-ketotestosterone are hydrolyzed to give the free alcohol, 6α-methyl-11-ketotestosterone.

EXAMPLE 10

6α-methyladrenosterone

To a solution of 0.3 gram of 6α-methyl-11-ketotestosterone in ten milliliters of acetic acid was added 0.2 gram of chromic anhydride, dissolved in two milliliters of acetic acid and one milliliter of water. The mixture was allowed to stand for four hours at room temperature and was then quenched by the addition of 100 milliliters of ice water. The ice water mixture was neutralized with sodium hydroxide solution and was then put into the refrigerator over night for a period of eighteen hours. The mixture was then filtered and the precipitated material collected on a filter, washed with water and recrystallized from methylene chloride-hexane to give 6α-methyladrenosterone.

EXAMPLE 11

6α-methyladrenosterone from 6α-methyl-11β-hydroxytestosterone

In the same manner given in Example 10, oxidizing 6α-methyl-11β-hydroxytestosterone with chromic anhydride, sodium dichromate or potassium dichromate in acidic solution results in the production of 6α-methyladrenosterone.

EXAMPLE 12

6α-methyl-11β-hydroxy-4-androstene-3,17-dione

Two hundred milligrams of 3-(N-pyrrolidinyl)-6-methyl-11β-hydroxy-3,5-androstadien-17-one in five milliliters of 95 percent ethanol was heated at reflux for a period of eighty minutes. While boiling the mixture was diluted with ten milliliters of hot water and then cooled. A product which separated in the form of needles, was recovered, washed with water and dried. This material was thereupon recrystallized twice from dilute acetone to give 6α-methyl-11β-hydroxy-4-androstene-3,17-dione of melting point 230 to 233 degrees centigrade and rotation $[\alpha]_D$ 169 degrees in 95 percent ethanol.

$$\lambda_{max.}^{alc.}\ 241\ M\mu\ (A_M\ 15,050)$$

Analysis.—Calcd. for $C_{20}H_{28}O_3$: C, 75.95; H, 8.92. Found: C, 75.72; H, 8.79.

EXAMPLE 13

6α-methyladrenosterone from 6α-methyl-11β-hydroxy-4-androstene-3,17-dione

In the same manner given in Example 6, 6α-methyl-11β-hydroxy-4-androstene-3,17-dione, dissolved in acetic acid was oxidized with a solution of chromic anhydride in acetic acid containing a small amount of water at room temperature to give 6α-methyladrenosterone.

EXAMPLE 14

6α-methyl-9α-fluoro-11β,17β-dihydroxy-4-androsten-3-one (6α-methyl-9α-fluoro-11β-hydroxytestosterone)

To a solution of two grams of 6α-methyl-11β-hydroxytestosterone in twelve milliliters of pyridine was added 1.5 grams of N-bromoacetamide. After standing at room temperature (about 24 degrees centigrade) for a period of fifteen minutes, the reaction solution was cooled to five to ten degrees centigrade and with shaking sulfur dioxide gas was passed over the surface until the solution gave no color with acidified starch-iodine paper. During the addition of sulfur dioxide gas the reaction became warm. The temperature was kept under thirty degrees centigrade by external cooling and by varying the rate of sulfur dioxide addition. Thereafter to the reaction mixture 100 milliliters of ice water was added and the resulting precipitate collected by filtration. This material was twice recrystallized from acetone-Skellysolve B hexanes to give 6α-methyl-17β-hydroxy-4,9(11)-androstadien-3-one.

To a solution of 1.5 grams of the thus obtained 6α-methyl-17β-hydroxy-4,9(11)-androstadien-3-one in 25 milliliters of tertiary butyl alcohol was added a solution of four milliliters of 72 percent perchloric acid in 25 milliliters of water, followed by a solution of 0.6 gram of N-bromoacetamide in fifteen milliliters of tertiary butyl alcohol. After stirring the reaction mixture for fifteen minutes a solution of 0.7 gram of sodium sulfite in forty milliliters of water was added and the reaction mixture was concentrated to a volume of about 125 milliliters under reduced pressure at about fifty degrees centigrade. After crystallization had started, the concentrate was cooled in an ice bath and while stirring 125 milliliters of water was added. After stirring for a period of one hour, the crystalline product was isolated by filtration, the crystals were washed with water, air dried and recrystallized from methanol to give 6α-methyl-9α-bromo-11β,17β-dihydroxy-4-androsten-3-one.

To a solution of 1.4 grams of 6α-methyl-9α-bromo-11β,17β-dihydroxy-4-androsten-3-one in 35 milliliters of acetone was added 1.4 grams of potassium acetate and the resulting suspension was heated under reflux for a period of eighteen hours. The mixture was then concentrated to approximately twelve milliliters of volume at reduced pressure on the steam bath and thereupon diluted with water and extracted with methylene chloride. The methylene chloride extracts were combined, washed with water, dried over anhydrous sodium sulfate and evaporated to give crude 6α-methyl-9β,11β-oxido-17β-hydroxy-4-androsten-3-one.

To approximately 2.5 grams of hydrogen fluoride and 4.5 milliliters of tetrahydrofuran contained in a polyethylene bottle and maintained at minus sixty degrees centigrade a solution of one gram of crude 6α-methyl-9β,11β-oxido-17α-hydroxy-4-androsten-3-one in four milliliters of methylene chloride was added. The light red colored solution was kept at approximately minus thirty degrees centigrade for one hour and then for two hours at minus ten degrees centigrade. At the end of this period it was mixed cautiously with an excess of cold sodium bicarbonate solution and the organic material extracted with the aid of additional methylene chloride. The combined extracts were washed with water, dried over anhydrous sodium sulfate, and concentrated to dryness. The thus obtained residue was twice recrystallized from ethyl acetate-Skellysolve B hexanes to give 6α-methyl-9α-fluoro-11β,17β-dihydroxy-4-androsten-3-one.

EXAMPLE 15

6α - methyl - 9α - fluoro - 17β - hydroxy - 4 - androstene-3,11-dione (6α-methyl-9α-fluoro-11-ketotestosterone)

A mixture was prepared containing in ten milliliters of acetic acid, 0.5 gram of 6α-methyl-9α-fluoro-11β,17β-dihydroxy-4-androsten-3-one acetate, prepared by esterification of 6α-methyl-9α-fluoro-11β,17β-dihydroxy-4-androsten-3-one in the manner shown in Example 2. To the thus obtained reaction mixture was then added 0.3 gram of chromic anhydride, dissolved in two milliliters of acetic acid and one milliliter of water. The thus obtained reaction mixture was allowed to stand at room temperature for a period of five hours whereupon one milliliter of methanol was added. The mixture was then stirred, diluted with 75 milliliters of water, and allowed to stand in the refrigerator for a period of eighteen hours. Thereafter the mixture was filtered, the precipitate thus collected was washed and three times recrystallized from ethyl acetate-Skellysolve B hexanes to give pure 6α-methyl-9α-fluoro-17β-hydroxy-4-androstene-3,11-dione 17-acetate (6α-methyl-9α-fluoro-11-ketotestosterone 17-acetate).

The thus obtained 6α-methyl-9α-fluoro-11-ketotestosterone 17-acetate was hydrolyzed with one-normal sodium hydroxide in aqueous methanol as shown in Example 8 to give 6α-methyl-9α-fluoro-11-ketotestosterone.

EXAMPLE 16

6α-methyl-9α-fluoroadrenosterone

To a solution of 6α-methyl-9α-fluoro-11-ketotestosterone (300 milligrams in five milliliters of acetic acid) was added 150 milligrams of potassium dichromate in three milliliters of acetic acid. The mixture was allowed to stand at room temperature for one hour and was during this period occasionally shaken. Thereafter the mixture was poured into fifty milliliters of water and thereto added two milliliters of methanol. The thus obtained solution was kept overnight in the refrigerator and thereupon filtered the next day. The precipitate thus-collected on the filter was washed several times with water and was finally three times recrystallized from aqueous methanol to give 6α-methyl-9α-fluoroadrenosterone.

6α-methyl-9α-fluoroadrenosterone is also prepared by:

(1) Treating 6α-methyl-11β-hydroxy-4-androstene-3,17-dione as shown in Example 14 with N-bromoacetamide in pyridine solution and thereupon with sulfur dioxide followed by water to produce the corresponding 6α-methyl-4,9(11)-androstadiene-3,17-dione;

(2) Treating the thus obtained 6α-methyl-4,9(11)-androstadiene-3,17-dione with N-bromosuccinimide in tertiary butyl alcohol in the presence of perchloric acid to give 6α-methyl-9α-bromo-11β-hydroxy-4-androstene-3,17-dione;

(3) Treating the thus obtained 6α-methyl-9α-bromo-11β-hydroxy-4-androstene-3,17-dione, dissolved in acetone, with potassium acetate at reflux temperature for a period of 24 hours to give the corresponding 6α-methyl-9β,11β-oxido-4-androstene-3,17-dione;

(4) Treating the thus obtained 6α-methyl-9β,11β-oxido-4-androstene-3,17-dione, dissolved in tetrahydrofuran, in a polyethylene bottle with liquid hydrogen fluoride at minus sixty degrees centigrade to give 6α-methyl-9α-fluoro-11β-hydroxy-4-androstene - 3,17 - dione; and (5) Oxidizing the 6α-methyl-9α-fluoro-11β-hydroxy-4-androstene-3,17-dione with chromic anhydride in acetic acid to obtain 6α-methyl-9α-fluoroadrenosterone.

It is to be understood that the invention is not to be limited to the exact details of operation or exact compounds shown and described herein, as obvious modifications and equivalents will be apparent to one skilled in the art, and the invention is therefore to be limited only by the scope of the appended claims.

We claim:

1. A compound selected from the group consisting of 6-methyl-11β,17β-dihydroxy-4-androsten-3-one, 6-methyl-17β-hydroxy-4-androstene-3,11-dione, 6-methyl-11β,17β-dihydroxy-4-androsten-3-one 17β-acylate, 6-methyl-17β-hydroxy-4-androstene-3,11-dione 17β-acylate, wherein the acyl group is of a hydrocarbon carboxylic acid containing from one to nine carbon atoms, inclusive; 6-methyl-11β-hydroxy - 4 - androstene - 3,17 - dione and 6-methyladrenosterone.

2. 6α-methyl-11β,17β-hydroxy-4-androsten-3-one.

3. 6α-methyl-17β-hydroxy-4-androstene-3,11-dione.

4. 6α-methyl-11β,17β - dihydroxy-4-androsten - 3 - one 17β-acetate.

5. 6α-methyl-17β-hydroxy-4-androstene - 3,11 - dione acetate.

6. 6α-methyl-11β-hydroxy-4-androstene-3,17-dione.

7. A process for the production of 6α-methyl-11β,17β-dihydroxy-4-androsten-3-one which comprises: reducing a 3-(N-cyclic tertiaryamino) - 6 - methyl - 11β - hydroxy-3,5-androstadien-17-one, wherein the cyclictertiaryamino radical is of the formula

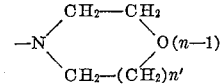

in which n and n' are whole numbers from one to two, inclusive, with a metal hydride to obtain the corresponding 3 - (N - cyclic tertiaryamino) - 6 - methyl - 11β,17-dihydroxy-3,5-androstadiene and hydrolyzing the thus obtained tertiary amine in an aqueous medium to obtain 6α-methyl-11β,17β-dihydroxy-4-androsten-3-one.

8. A process for the production of 6α-methyl-17β-hydroxy-4-androstene-3,11-dione which comprises: reducing a 3-(N-cyclotertiaryamino)-6-methyl-11β-hydroxy-3,5-androstadien-17-one, wherein the cyclic tertiaryamino radical is of the formula

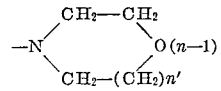

in which n and n' are whole numbers from one to two, inclusive, with a metal hydride to obtain the corresponding 3-(N-cyclic tertiaryamino) - 6 - methyl-11β,17β-dihydroxy-3,5-androstadiene, hydrolyzing the thus obtained tertiary amine in an aqueous medium to obtain 6α-methyl-11β,17β-dihydroxy-4-androsten-3-one, esterifying the thus obtained 6α - methyl - 11β,17β - dihydroxy-4-androsten-3-one with an acylating agent selected from organic carboxylic acid anhydrides and halides wherein the acyl group of the organic acid contains from one to nine carbon atoms, inclusive, to obtain the corresponding 6α-methyl-11β,17β-dihydroxy-4-androsten-3 - one 17β-acylate, oxidizing the 17β-acylate with chromic acid to obtain the 6α-methyl-17β-hydroxy - 4 - androstene - 3,11-dione and hydrolyzing with a base to obtain 6α-methyl-17β-hydroxy-4-androstene-3,11-dione.

No references cited.

UNITED STATES PATENT OFFICE

Certificate of Correction

August 26, 1958

Patent No. 2,849,464

Milton E. Herr et al.

It is hereby certified that error appears in the printed specification of the above numbered patent requiring correction and that the said Letters Patent should read as corrected below.

Column 5, line 8, for "-androstenel3,11-" read —-androstene-3,11- —; column 8, line 25, for "6α-11β-" read —6α-methyl-11β- —; column 10, lines 39 and 40, for "milliliters of tertiary butyl" read —milliliters of methylene chloride and 75 milliliters of tertiary butyl—; column 12, line 22, for "-11β,17β-hydroxy-" read — -11β,17β-dihydroxy- —; lines 40 and 41, for "-11β,17-dihydroxy-" read — -11β,17β-dihydroxy- —.

Signed and sealed this 2nd day of June 1959.

[SEAL]

Attest:
KARL H. AXLINE,
*Attesting Officer.*

ROBERT C. WATSON,
*Commissioner of Patents.*